United States Patent
Aaron

(10) Patent No.: US 8,116,748 B2
(45) Date of Patent: Feb. 14, 2012

(54) MANAGEMENT OF LOCATIONS OF GROUP MEMBERS VIA MOBILE COMMUNICATIONS DEVICES

(75) Inventor: Jeffrey Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1031 days.

(21) Appl. No.: 11/610,898

(22) Filed: Dec. 14, 2006

(65) Prior Publication Data

US 2008/0146205 A1 Jun. 19, 2008

(51) Int. Cl.
*H04M 3/42* (2006.01)
(52) U.S. Cl. .......... 455/414.2; 455/404.2; 455/419; 455/421; 709/209; 709/219; 709/222; 380/258; 380/270; 370/230.1; 370/310.2; 370/325; 370/326
(58) Field of Classification Search ........ 455/404.2, 455/419, 421; 709/209, 219, 222; 380/258, 380/270; 370/230.1, 310.2, 325, 326
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 5,812,932 A | 9/1998 | Wiedeman et al. | |
| 6,130,707 A | 10/2000 | Koller et al. | |
| 6,567,835 B1 | 5/2003 | Blomgren et al. | |
| 6,580,914 B1 * | 6/2003 | Smith | 455/456.6 |
| 6,587,835 B1 * | 7/2003 | Treyz et al. | 705/14.64 |
| 6,853,628 B2 | 2/2005 | Chitrapu | |
| 6,892,217 B1 | 5/2005 | Hanmann et al. | |
| 6,912,398 B1 | 6/2005 | Domnitz | |
| 6,977,997 B2 | 12/2005 | Shioda et al. | |
| 7,136,658 B2 | 11/2006 | Cole et al. | |
| 7,136,688 B2 | 11/2006 | Jung et al. | |
| 7,324,959 B2 * | 1/2008 | Malkin et al. | 705/16 |
| 7,599,795 B1 | 10/2009 | Blumberg et al. | |
| 7,634,228 B2 * | 12/2009 | White et al. | 455/3.06 |
| 2002/0082931 A1 * | 6/2002 | Siegel et al. | 705/26 |
| 2002/0095333 A1 | 7/2002 | Jokinen et al. | |
| 2002/0147928 A1 | 10/2002 | Mahajan et al. | |
| 2002/0178385 A1 | 11/2002 | Dent et al. | |
| 2003/0006913 A1 | 1/2003 | Joyce et al. | |
| 2003/0008661 A1 | 1/2003 | Joyce et al. | |
| 2003/0050039 A1 | 3/2003 | Baba et al. | |

(Continued)

OTHER PUBLICATIONS

U.S. Appl. No. 11/843,954, filed Aug. 23, 2007.

(Continued)

*Primary Examiner* — Nimesh Patel
(74) *Attorney, Agent, or Firm* — Parks IP Law LLC; Jennifer P. Medlin, Esq.

(57) ABSTRACT

The location of group members having mobile communications devices such as cellular telephones, PDAs, and the like are managed by maintaining group member location awareness among the individual group members. The location of each group member is known on the basis of the determined location of the mobile communications device of each, either in absolute terms or in relative terms. The absolute and/or relative location may be reported by the mobile communications devices, such as to a mobile communications device of an administrator of the group or directly to individual group members. Rules may be established for providing notifications such as alerts and alarms to the group members when a group member strays from the group or from a fixed reference point and information may be provided to the straying member to assist the straying member in returning to the group.

19 Claims, 8 Drawing Sheets

U.S. PATENT DOCUMENTS

| | | |
|---|---|---|
| 2003/0198204 A1 | 10/2003 | Taneja et al. |
| 2004/0032503 A1 | 2/2004 | Monden et al. |
| 2004/0082351 A1 | 4/2004 | Westman |
| 2004/0092269 A1 | 5/2004 | Kivinen |
| 2004/0110515 A1 | 6/2004 | Blumberg et al. |
| 2004/0141606 A1 | 7/2004 | Torvinen |
| 2004/0209602 A1 | 10/2004 | Joyce et al. |
| 2005/0073406 A1 | 4/2005 | Easley et al. |
| 2005/0075116 A1 | 4/2005 | Laird et al. |
| 2005/0113123 A1 | 5/2005 | Torvinen |
| 2005/0117516 A1 | 6/2005 | Yang |
| 2005/0149443 A1 | 7/2005 | Torvinen |
| 2005/0153729 A1 | 7/2005 | Logan et al. |
| 2005/0176420 A1 | 8/2005 | Graves et al. |
| 2005/0181824 A1 | 8/2005 | Lloyd |
| 2005/0215238 A1 | 9/2005 | Macaluso |
| 2005/0221876 A1 | 10/2005 | Van Bosch et al. |
| 2005/0248456 A1 | 11/2005 | Britton et al. |
| 2005/0266870 A1 | 12/2005 | Benco et al. |
| 2005/0288038 A1 | 12/2005 | Kim |
| 2006/0009240 A1 | 1/2006 | Katz |
| 2006/0033625 A1 | 2/2006 | Johnson et al. |
| 2006/0089158 A1 | 4/2006 | Lai et al. |
| 2006/0095540 A1 | 5/2006 | Anderson et al. |
| 2006/0194595 A1 | 8/2006 | Myllynen et al. |
| 2006/0224863 A1 | 10/2006 | Lovett et al. |
| 2006/0253453 A1 | 11/2006 | Chmaytelli et al. |
| 2007/0004393 A1 | 1/2007 | Forsberg et al. |
| 2007/0037561 A1 | 2/2007 | Bowen et al. |
| 2007/0037605 A1* | 2/2007 | Logan .................. 455/567 |
| 2007/0054687 A1 | 3/2007 | Akita et al. |
| 2007/0136796 A1 | 6/2007 | Sanchez et al. |
| 2007/0182544 A1 | 8/2007 | Benson et al. |
| 2007/0182818 A1 | 8/2007 | Buehler |
| 2007/0232342 A1 | 10/2007 | Larocca |
| 2007/0287379 A1 | 12/2007 | Matsuura et al. |
| 2008/0004951 A1 | 1/2008 | Huang et al. |
| 2008/0032677 A1 | 2/2008 | Catovic et al. |
| 2008/0045236 A1 | 2/2008 | Nahon et al. |
| 2008/0052169 A1 | 2/2008 | O'Shea et al. |
| 2008/0114778 A1 | 5/2008 | Siegel |
| 2008/0182563 A1 | 7/2008 | Wugofski et al. |
| 2008/0182586 A1 | 7/2008 | Aaron |
| 2008/0268895 A1 | 10/2008 | Foxenland |
| 2009/0176524 A1 | 7/2009 | David |

OTHER PUBLICATIONS

Helio GPS-powered Buddy Beacon, http://www.helio.com, date unknown, believed to exist before filing of the present application.

GPS Locator Phone, http://www.wherify.com/wherifone/kids.html?page-kids, copyright 2006, believed to exist before filing of the present application.

Dodgeball.com bringing your phone to life. http://www.dodgeball.com, copyright 2006, believed to exist before filing of the present application.

OnStar Technology, http://www.onstar.com/US_english/jsp/explore/onstar_basics/technology.jsp, copyright 2006, believed to exist before filing of the present application.

U.S. Appl. No. 11/611,345, filed Dec. 15, 2006.
U.S. Appl. No. 11/610,890, filed Dec. 14, 2006.
U.S. Appl. No. 11/611,434, filed Dec. 15, 2006.
U.S. Appl. No. 11/610,927, filed Dec. 14, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/668,848, filed Jan. 30, 2007.
U.S. Appl. No. 11/627,269, filed Jan. 25, 2007.

Palo Wireless "Generic Access Profile" www.palowireless.com/infotooth/tutorial/kl_gap.asp (2004).

Aalto et al. "Bluetooth and WAP Push Based Location-Aware Mobile Advertising System" MobiSys (2004).

Woodings et al. "Rapid Heterogeneous Connection Establishment: Accelerating Bluetooth Inquiry Using IrDA" (2002).

Woodings et al. "Rapid heterogeneous ad hoc connection establishment: accelerating Bluetooth inquiry using IrDA" ieeexplore.ieee.org (2002).

Huang et al. "A self-adaptive zone routing protocol for Bluetooth scatternets", www.sciencedirect.com (2004).

Leopold et al. "Bluetooth and Sensor Networks: A Reality Check", SenSys (2003).

* cited by examiner

MANAGEMENT OF LOCATIONS OF GROUP MEMBERS VIA MOBILE COMMUNICATIONS DEVICES

TECHNICAL FIELD

Embodiments are related to management of group members. More particularly, embodiments are related to the management by reporting of location of group members via mobile communications devices.

BACKGROUND

Individuals are typically members of one or more groups, the groups existing conceptually or based on physical proximity. For example, a family may be considered a group, employees of a business may be considered another group, employees of one particular division within a business may be considered another group, and so on. The family group may exist conceptually in that the family members may be in various unrelated locations, or the family group may exist based on physical proximity where at least some members of a family are together at a particular physical site such as at home or at a shopping mall.

In many cases, it is desirable to manage the group by keeping the group members closely together or by keeping group members within pre-defined areas. For example, a family may visit a shopping mall and the children may wish to wander about while the parents prefer that the children stay within a certain area or within a certain distance from the parent. Other than manually keeping tabs on the children such as by maintaining visual contact or by making periodic contact via a phone call or text message, the parent or other family member has no ability to manage the location of the children. Furthermore, the children have no ability to manage or otherwise maintain an awareness of the location of the other children or parents.

SUMMARY

Embodiments address these issues and others by providing location management of group members via location reporting of mobile communications devices of the group members to one or more other members of the group and/or by providing guidance to group members to assist them in returning to the group. Accordingly, an absolute and/or relative location of the group members may be automatically reported to other group members so that each member maintains an awareness of where a collective group resides and where individual members of the group reside both when in adequate physical proximity to the collective group and when exceeding an allowable distance from the collective group.

Embodiments provide a mobile communications device that includes a wireless communications transceiver, a location determination device, and a memory storing a first identifier of the mobile communications device and one or more identifiers for other mobile communications devices in a group. The mobile communications device further includes a processor configured to report information specifying a determined location generated by the location determination device in association with the first identifier to at least one other mobile communications device for which an identifier is stored. The processor is further configured to receive information specifying a current location and identifier of at least one other mobile communications device. Additionally, the processor is further configured to compare the determined location generated by the location determination device relative to a specified location parameter, compare the current location of the at least one other mobile communications device to the specified location parameter, and generate a notification upon determining that the determined location or the current location of the other mobile communication device is outside of the specified location parameter.

Embodiments provide a method of grouping users of mobile communications devices. The method involves, at a mobile communications device of one of the users, storing in memory a first identifier of the mobile communications device and one or more identifiers for other mobile communications devices in a group. The method further involves determining a current location of the mobile communications device at the mobile communications device and reporting from the mobile communications device information specifying the determined location in association with the first identifier to at least one other mobile communications device for which an identifier is stored. Additionally, the method involves receiving at the mobile communications device information specifying a current location and identifier of at least one other mobile communications device of the group. The method further involves determining whether the mobile communications device or the at least one other mobile communication device has exceeded a maximum distance threshold from a point of reference specified for the group. Additionally, when the mobile device or the at least one other mobile communications device has exceeded the maximum distance threshold, then a notification is generated at the mobile communications device.

Embodiments provide a computer readable medium containing instructions that perform acts that include at a mobile communications device of a user of a group, storing in memory a first identifier of the mobile communications device and one or more identifiers for other mobile communications devices in the group. The acts further include determining a current location of the mobile communications device at the mobile communications device and reporting from the mobile communications device information specifying the determined location in association with the first identifier to at least one other mobile communications device for which an identifier is stored. Additionally, the acts include receiving at the mobile communications device information specifying a current location and identifier of at least one other mobile communications device of the group. The acts further include determining whether the mobile communications device or the at least one other mobile communication device has exceeded a maximum distance threshold from a point of reference based on a current position of the group members. When the mobile device or the at least one other mobile communications device has exceeded the maximum distance threshold, then a notification is generated at the mobile communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Exemplary embodiments provide group members with the ability to maintain awareness and thereby manage the location of other group members via location reporting of mobile communications devices of the group members. Accordingly, the group members who use the mobile communications devices benefit by being able to maintain themselves and other group members within desired location-based parameters set for the group.

Figure 1:
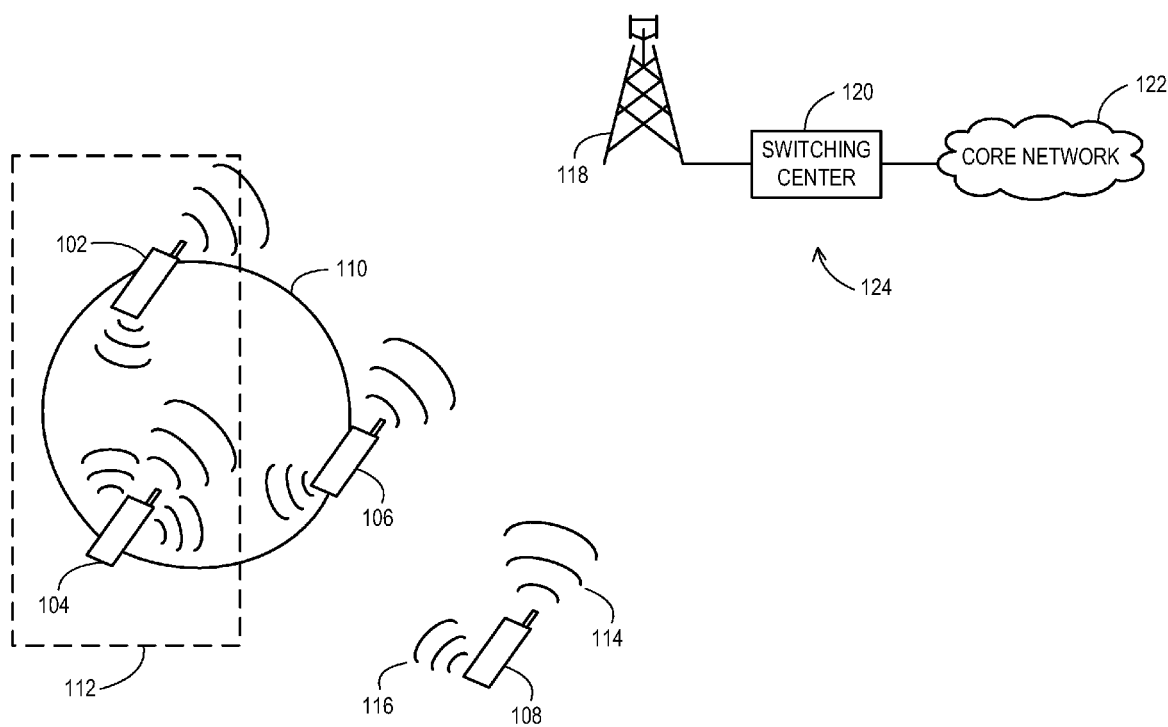
FIG. 1 shows one example of a grouping of mobile communication devices and a mobile communications network.

FIG. 1 shows an example of a grouping of individuals and their corresponding mobile communications devices where those individuals are part of a group. The group of this example includes a first mobile communications device 102, a second mobile communications device 104, a third mobile communications device 106, and a fourth mobile communications device 108. As can be seen, the group includes a set of closely positioned mobile communications devices 102, 104, and 106 forming a flock and also includes a distantly positioned mobile communications device 108 that falls outside the flock.

The group is defined by each mobile communications device having an identifier (ID) that is associated with the group in memory of one or more of the mobile communications devices of the group. For example, one of the mobile communications devices may be an administrator, or a sub-administrator having duties delegated to it by the administrator, and such an administrator maintains the group definition by controlling which mobile communications devices' IDs are associated with the group. Each mobile communications device of the group may also maintain in memory the IDs of each of the mobile communications devices belonging to the group so that peer-to-peer location queries can be performed as discussed below.

Various location-based rules may be established for the group. For example, the mobile communications device 108 may have the authority to stray beyond the flock or may be in violation of a location-based rule set for the group by straying too far from the flock. A relative perimeter 110 may be established to define the flock, where the relative perimeter 110 is a distance threshold from some relative point of the flock. Such relative points of the flock may include a centroid of the mobile communications devices, a center-most mobile communications device, a closest mobile communications device that is within the flock, or a particular mobile communications device of the group.

Other examples of location-based rules may include general monitoring limits imposed on the group members, such as distance thresholds relative to absolute reference points or areas, such as fixed reference points or reference points that are dynamic due to movement of the mobile device (e.g., the closest point of a defined area where the closest point varies as the mobile device moves). For example, area 112 may define the permissible area for the group, and a mobile communications device has strayed beyond the permissible area 112. Furthermore, both relative and absolute limitations may be in effect where violation of either results in some remedial action being taken or where only violation of both results in a remedial action.

As shown, mobile communications device 106 has maintained its cohesiveness with the flock as falling within the relative perimeter 110 but has strayed beyond the permissible area 112. For embodiments where either type of violation may trigger a remedial action, then the position of mobile communications device 106 outside of the area 112 may trigger an alert to the device 106 and/or to the other devices 102, 104, and 108 of the group. However, for embodiments where both types of violation are required to trigger a remedial action, then the position of the mobile communications device 106 within the flock defined by the relative perimeter 110 results in no remedial action being taken. In either embodiment, a remedial action would be taken for mobile communications device 108 since it has violated both the relative and absolute perimeters 110, 112 for scenarios where those perimeters are applicable to device 108. Note also that rules and/or permissions may be set differently for different members of the group or flock. Further, the flock may be defined differently for different group members, for instance in terms of the flock extent or perimeter being defined based on different subsets of the group and/or other differences in flock, permission, or remedial parameters.

An example of a family at a shopping mall illustrates the application of these location-based rules, where each family member to be managed has a mobile communications device. For example, the area 112 may be a particular section of a store, a particular store, or the entire mall area. Older children of the group may be generally monitored relative to this absolute area 112 but not monitored relative to the flock such that the older children may wander the area while straying from their parent. Younger children may not be trusted to wander as far from their parent so younger children of the group are being monitored relative to the flock where the flock is defined in relation to the mobile communication device of the parent and/or other younger children.

In order to monitor the mobile communication devices in a flocking mode and/or a general monitoring mode, the mobile communication devices keep track of their own relative and/or absolute location. This may involve the use of short-range wireless communication signals 116 and/or long-range wireless communication signals 114. Examples of short-range wireless signals 116 include Bluetooth® signals, Wi-Fi signals, ultra-wideband signals, infrared signals, and the like which allow for direct peer-to-peer signaling. Examples of long-range wireless signals 114 include cellular, such as GSM, PCS, and the like which allow for communication to other devices through a remote base station 118 and switching center 120 of a mobile communications system 124.

For example, short-range wireless communication signals 116 may be periodically transmitted by the mobile communications devices and be addressed to other group IDs of the group. The short-range wireless communication signals 116 may transmit a "ping" style message where a "pong" return message is received from one of the other mobile communication devices to which the "ping" was addressed and the time for the return message to be received specifies the distance between the two devices, as is well known in the art of range finding. Furthermore, the short-range wireless communication signals 116 being received may be measured for signal strength to further specify the relative distance between the sender device and recipient device, as is also well known in the art of range finding. The collective distances from these short-range communications 116 may be used by a device to triangulate its position relative to the assemblage of the other devices to thereby determine its position within the flock. Thus, the short-range wireless communication signals 116 are useful for determining whether each device is within the perimeter 110.

The long-range wireless communication signals 114 may be used to contact the other mobile communications devices over greater distances such as to report absolute location and to transmit notifications such as alerts and alarms. Furthermore, the long-range wireless signals 114 may be used as a fall-back position where a device has attempted to operate in flocking mode but all other devices of the group are out of short-range, i.e., beyond the range of the short-range signals 116 or are otherwise unable to communicate via the short-range signals 116 due to interference, or if the device is configured to rigorously use the long-range signals 114. The device 108 straying from the flock perimeter 110 by a significant distance is an example where the long-range signals 114 may be used even when the device 108 is in a flocking mode of group management. In that case, one or more of the devices 102, 104, 106 of the flock will receive communications from the base station 118 via the long-range signals 114 to obtain the information regarding the absolute location of the device 108. Note that in long range communications networks where base stations are not employed, long range communications may occur between the devices themselves.

Returning to the mobile communications system 124, the switching center 120 is interconnected to a core network 122 which then connects to other switching centers having other base stations as well as connection to the other telephone networks such as wireline networks. The switching center 120 may be in contact with multiple base stations such that if a device strays beyond range of one base station, then it communicates with another and the switching center 120 directs communications from one device of the group being received at one base station to a base station to which a recipient device is registered.

Figure 2:
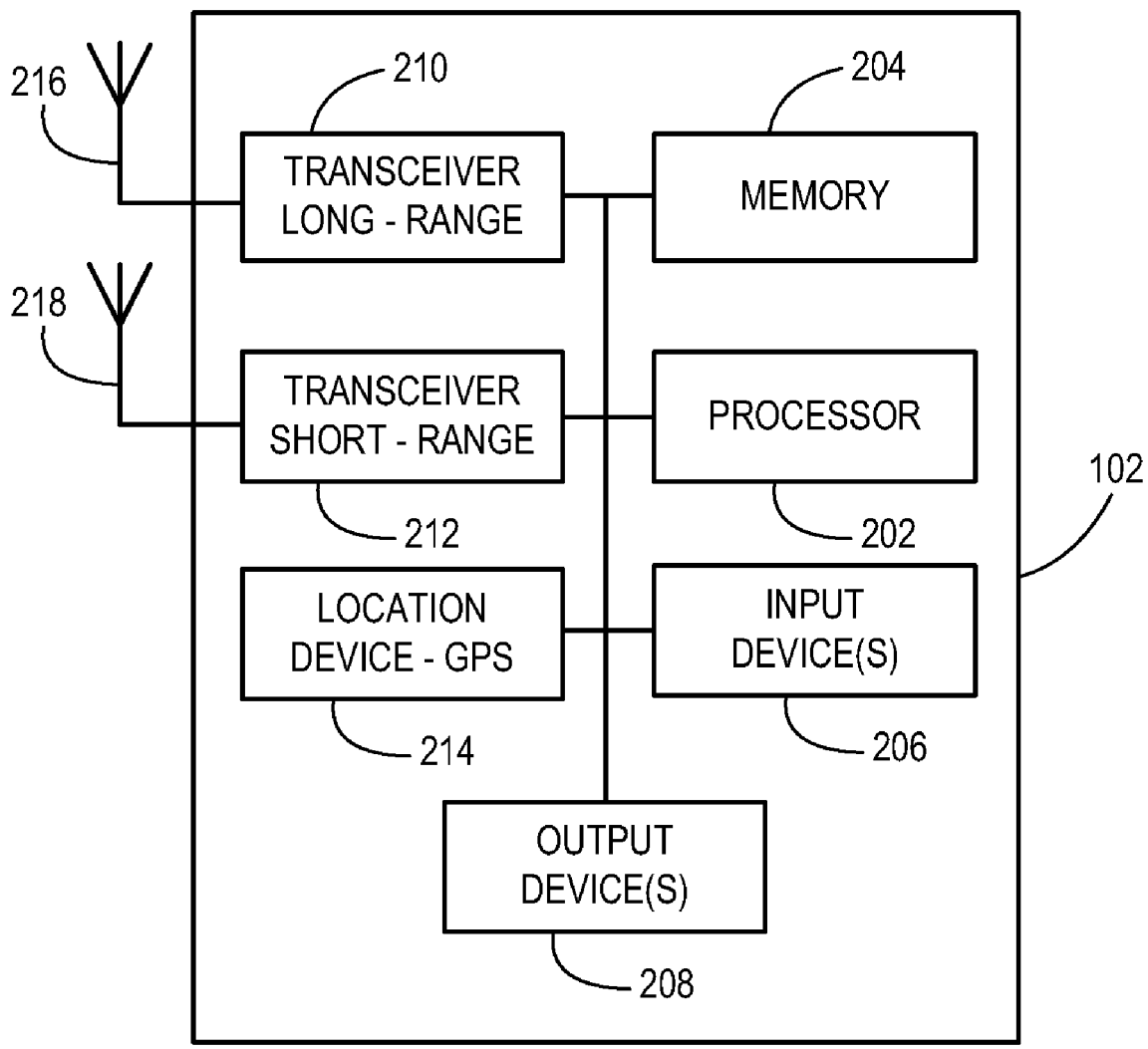
FIG. 2 shows one example of a mobile communications device that reports its location and receives information regarding the location of other mobile communications devices within the same group.

FIG. 2 shows the components of one example of the mobile communications device 102 for interacting with the other mobile communications devices of the group. According to exemplary embodiments, the mobile communications device 102 includes a processor 202, a memory 204, input devices 206, and output devices 208. The mobile communications device 102 also includes a long-range transceiver 210 with an antenna 216 for communicating with a remote wireless endpoint such as a cellular base station as well as a short-range transceiver 212 with an antenna 218 for communicating directly with other mobile communications devices.

The processor 202 performs actions based on instructions either hard coded into the processor 202 or stored in the memory 204. The logical operations performed are discussed below in relation to FIGS. 3A-3B and 4A-4B. The processor 202 may be a dedicated purpose processor or a general purpose programmable processor or some combination. The memory 204 may be volatile memory, non-volatile memory, or a combination thereof. The processor 202 and/or memory 204 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The input device 206 may include a keypad, keyboard, touchscreen, voice recognized input, and so forth. The input device 206 provides data to the processor 202 which acts upon the input to perform requested tasks. The input device 206 may be used to configure administration options as discussed below in relation to FIG. 3A as well as to initiate other activities such as to make calls to other devices, manually trigger alerts among the devices of the group, and so forth.

The output device 210 may include a display screen and/or audio output. The output device 210 may provide an interface allowing the user to make selections to configure settings including the administrator settings of the group. The output device 210 also provides the notification, such as an alert or an alarm in the form of visual displays, audible sounds, and the like.

The mobile communications device 102 may also contain one or more location devices 214 that produce data that identifies the absolute location of the mobile communications device. Examples include GPS receivers, cellular triangulation receivers, various combination location-determining modes, externally-aided location determinations, estimation methods, and the like. The absolute position may then be used to determine whether the device 102 has exceeded a distance threshold, either from an absolute reference point or a flock-relative reference point.

Figure 3A:
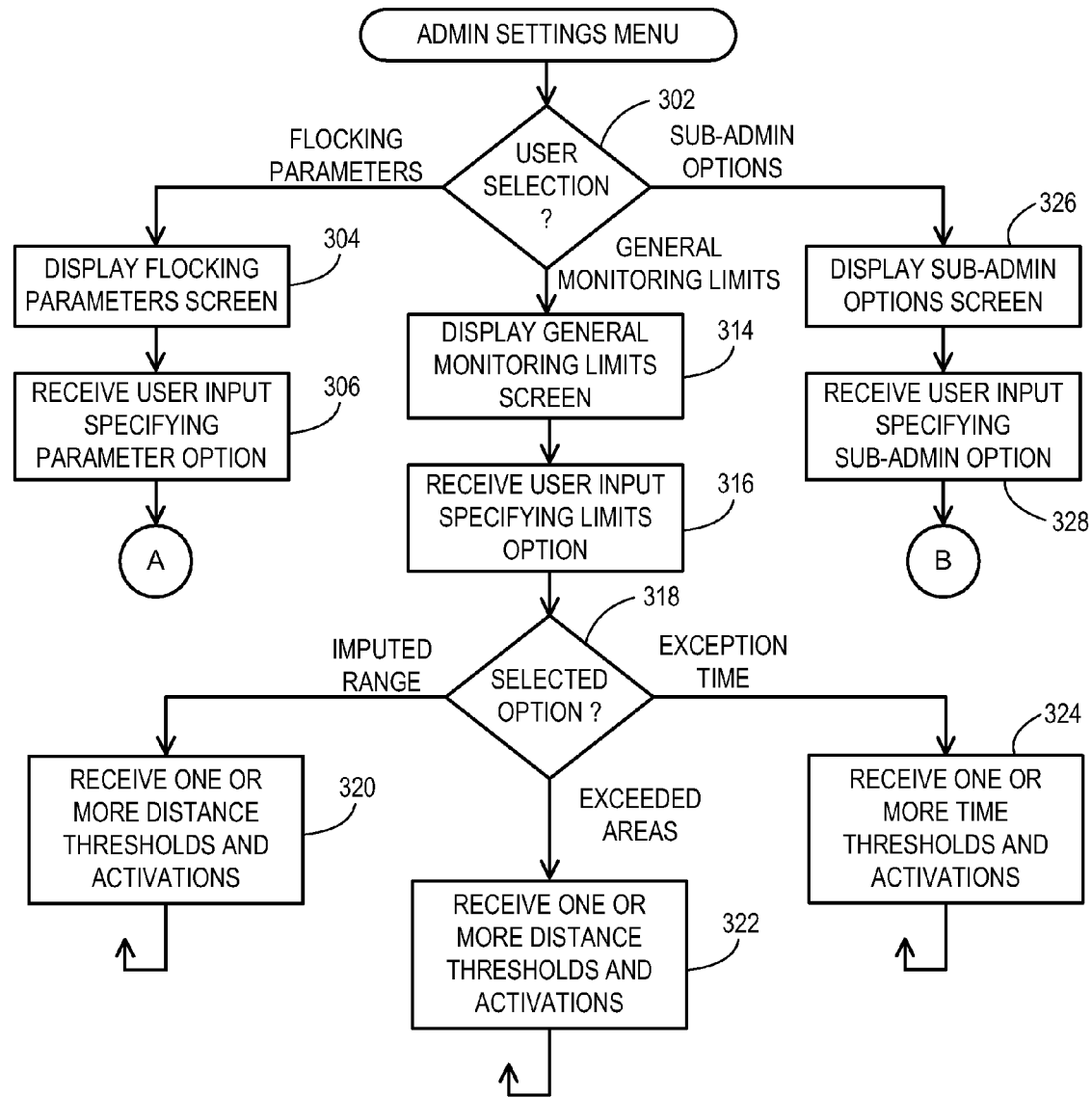
FIGS. 3A-3D show one example of the logical operations of a mobile communications device of an administrator of the group.

FIG. 3A shows an example of logical operations performed by a mobile communications device, and particularly by the mobile communications device of the user who is the administrator for the group. From the administrator menu, the device determines whether the user has made a selection from the menu at query operation 302, the options being flocking parameters, general monitoring limits, and sub-administrator options in this example. Upon selection of the flocking parameters option, the device displays the flocking parameters screen at display operation 304. The device then receives user input that specifies a parameter option to configure at input operation 306. Query operation 308 then determines which option has been input, either a relative range parameter or an exception time parameter in this example.

When the relative range has been selected, then the device receives one or more distance thresholds for the flock-relative monitoring at input operation 310. Furthermore, input may be received to make one or more of the distance thresholds active or inactive. There may be many different relative distance thresholds to configure and activate. For example, a threshold may be set as to how far a device may stray from a next closest device of the flock. A threshold may be set as to how far a device may stray from a calculated centroid of the flock. A threshold may be set as to how far a device may stray from a closest-to-center member of the flock. A threshold may also be set as to how far a device may stray from an administrator or from another group member in particular such as a sub-administrator or other specially-designated member. Multiple thresholds may be specified and activated and function so that only one must be complied with or such that multiple ones must be complied with to avoid remedial action. Conditional thresholds may also be used, such that a threshold is considered only after another condition has been met, for instance the previous triggering of another threshold. Additionally, the thresholds may be set on a group member basis, where one group member can stray farther than another and continue to be considered adequately within the flock.

When the exception time has been selected, then the device receives one or more time thresholds for the flock-relative monitoring at input operation 312. Furthermore, input may be received to make one or more of the time thresholds active or inactive. There may be many different time thresholds to configure and activate. For example, a threshold may be set as to how long each of the distance thresholds may be exceeded before remedial action such as a particular level of notification is needed. For example, an alert for exceeding a particular distance threshold may have a time threshold of zero so that it immediately is provided when the distance threshold is exceeded whereas an alarm may have a time threshold greater than zero such that the alarm is provided only if the group member in violation fails to return within the threshold within the allotted time. Another example of a time threshold is a time that a group member is out of contact with the group, either for short-range communications, long-range communications, or both. As with distance thresholds, the time thresholds may be set on a group member basis such that some members may stray longer than others before remedial action is to occur. Multiple thresholds and conditional thresholds may likewise be used.

Returning to query operation 302, if the selection is for general monitoring limits, then the device displays the general monitoring limits screen at display operation 314. The device then receives user input that specifies a limits option to configure at input operation 316. Query operation 318 then determines which option has been input, either an imputed range limit, an exceeded areas limit, or an exception time limit in this example.

When the imputed range option has been selected, then the device receives one or more distance thresholds for the general location monitoring at input operation 320. Furthermore, input may be received to make one or more of these distance thresholds active or inactive. There may be many different absolute distance thresholds to configure and activate. For example, a threshold may be set as to how far a device may stray from a fixed reference point considered to be a safe zone. Furthermore, distance thresholds may be configured relative to how far the device may stray from the device of another member, such as the administrator, without regard to whether either device is within the flock as defined by the flock perimeter 110. As with the relative distance thresholds, these thresholds may also be configured on a group member basis and multiple distance thresholds may apply simultaneously. Types of thresholds and threshold values may be used in any reasonable combination and may also be multiple and/or conditional as desired.

When the exceeded areas option has been selected, then the device receives input specifying one or more borders at input operation 322. Such border information may come from a built-in geographical information services (GIS) map of the current area or of such GIS information obtained via a map service accessible through the mobile communications network 124. Furthermore, the device may also receive distance thresholds relative to the selected borders so that group members may stray beyond the border by some amount before remedial action is taken. As with the relative distance thresholds, these thresholds may also be configured on a group member basis and multiple distance thresholds may apply simultaneously. Types of thresholds and threshold values may be used in any reasonable combination and may also be multiple and/or conditional as desired.

When the exception time option has been selected, then the device receives one or more time thresholds for the flock-relative monitoring at input operation 324. Furthermore, input may be received to make one or more of the time thresholds active or inactive. There may be many different time thresholds to configure and activate. For example, a threshold may be set as to how long each of the absolute distance thresholds may be exceeded before remedial action such as a particular level of notification is needed. As with distance thresholds, the time thresholds may be set on a group member basis such that some members may stray longer than others from the reference point before remedial action is to occur.

Returning to query operation 302, where the user has selected the sub-administrator options, the device displays those options at display operation 326. The device then receives user input to specify the sub-administrator option of interest at input operation 328. Query operation 330 then detects which option has been selected, either an option to define sub-administrators or an option to delegate rights and duties to sub-administrators in this example. Depending on rights, duties, and other considerations, certain sub-administrators may be given special designations and treated differently using different rules, thresholds, parameters, processes, etc. These designations and differences, whether administrators, sub-administrators, or other designated members, may be communicated to and displayed upon pertinent devices via menu-selected windows/screens/tables/lists and/or pop-ups which are triggered and may be context-dependent.

When the option to define sub-administrators has been selected, then the device receives user input specifying one or more group member IDs that are to be sub-administrators and stores the group ID as a sub-administrator at input operation 332. The sub-administrator may then be given rights and duties, such as keeping track of sub-flocks that may exist around the sub-administrator. For example, in a family, an older child may wish to stray from the parent and the younger children may wish to be near the older child. The parent may give the older child a sub-administrator status to manage the sub-flock that has strayed from the parent.

When the option to delegate rights and duties to the sub-administrators has been selected, then the device receives user input specifying the rights and duties on a sub-administrator basis or for all sub-administrators at input operation 334. For example, the sub-administrator may be given the right to exceed certain relative distance thresholds set for the primary flock but be given duties for managing the sub-flock that will assemble around the sub-administrator. The sub-administrator may be given the duty to periodically report information about the sub-flock to the administrator to the extent the administrator is not already obtaining such information directly from the sub-flock member's devices.

Upon setting the rights and duties of the sub-administrators, the device then sends the delegations to the devices corresponding to the mobile communications devices corresponding to the sub-administrator group IDs that have been set. The mobile communications devices of the sub-administrators then enter a sub-administrative mode much like the operational mode of the administrator's mobile communications device. The operational mode is discussed below in relation to FIG. 3B. The operational mode of a member device with lesser rights and/or responsibilities is discussed below in relation to FIGS. 4A and 4B.

Figure 3B:
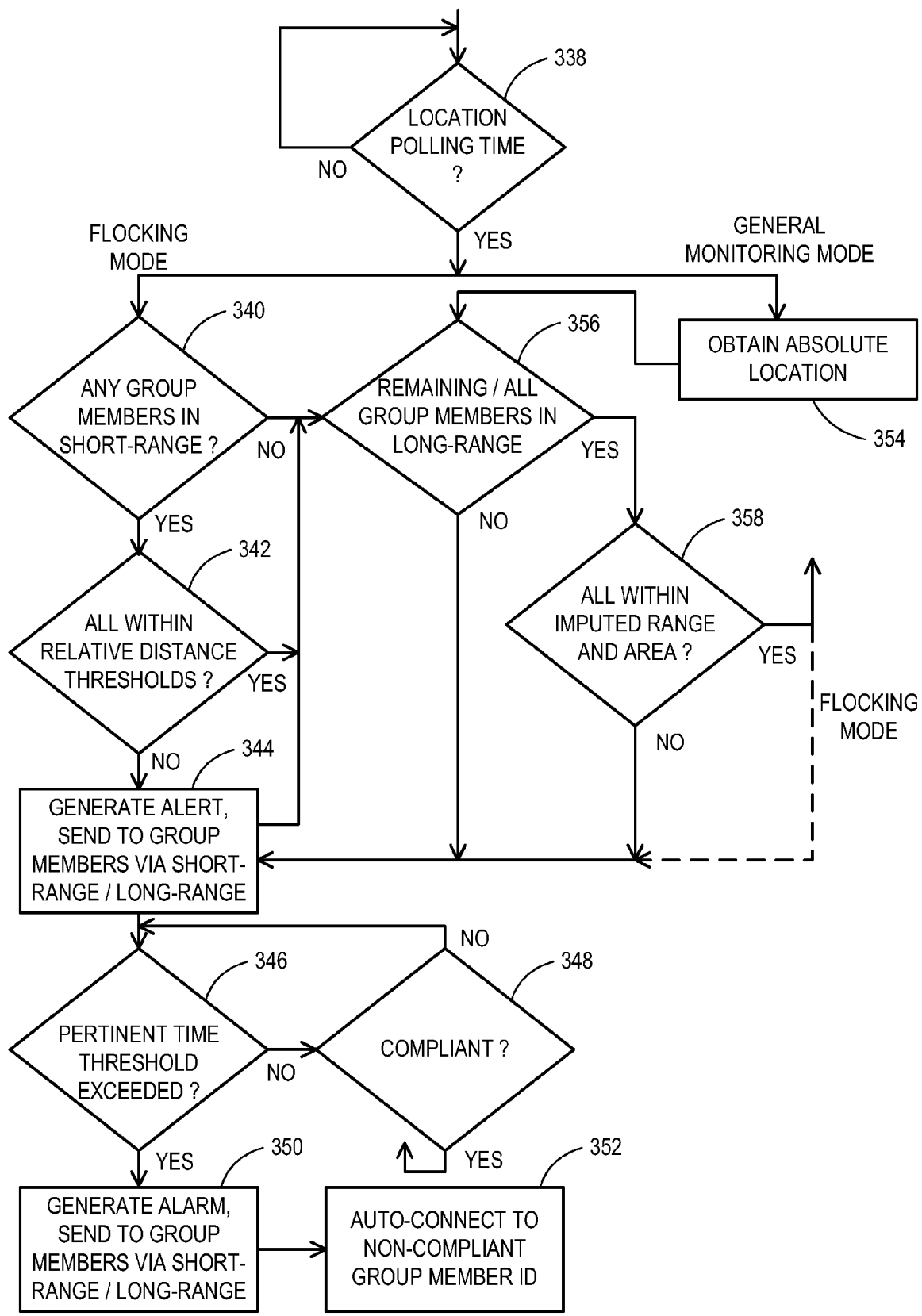
Figure 3C:
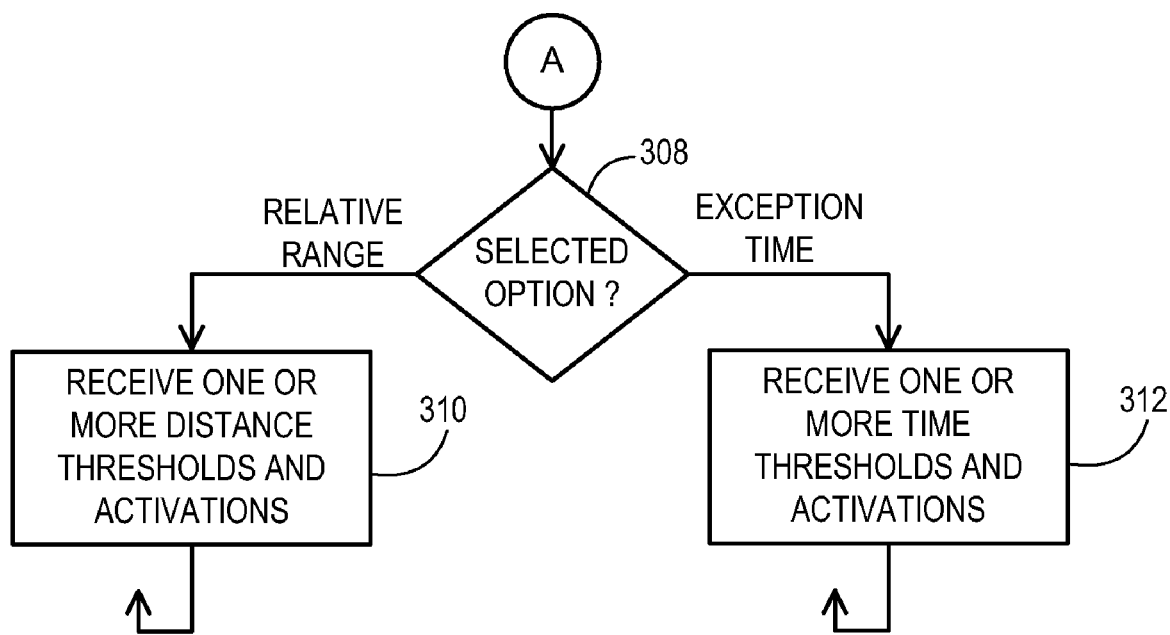
Figure 3D:
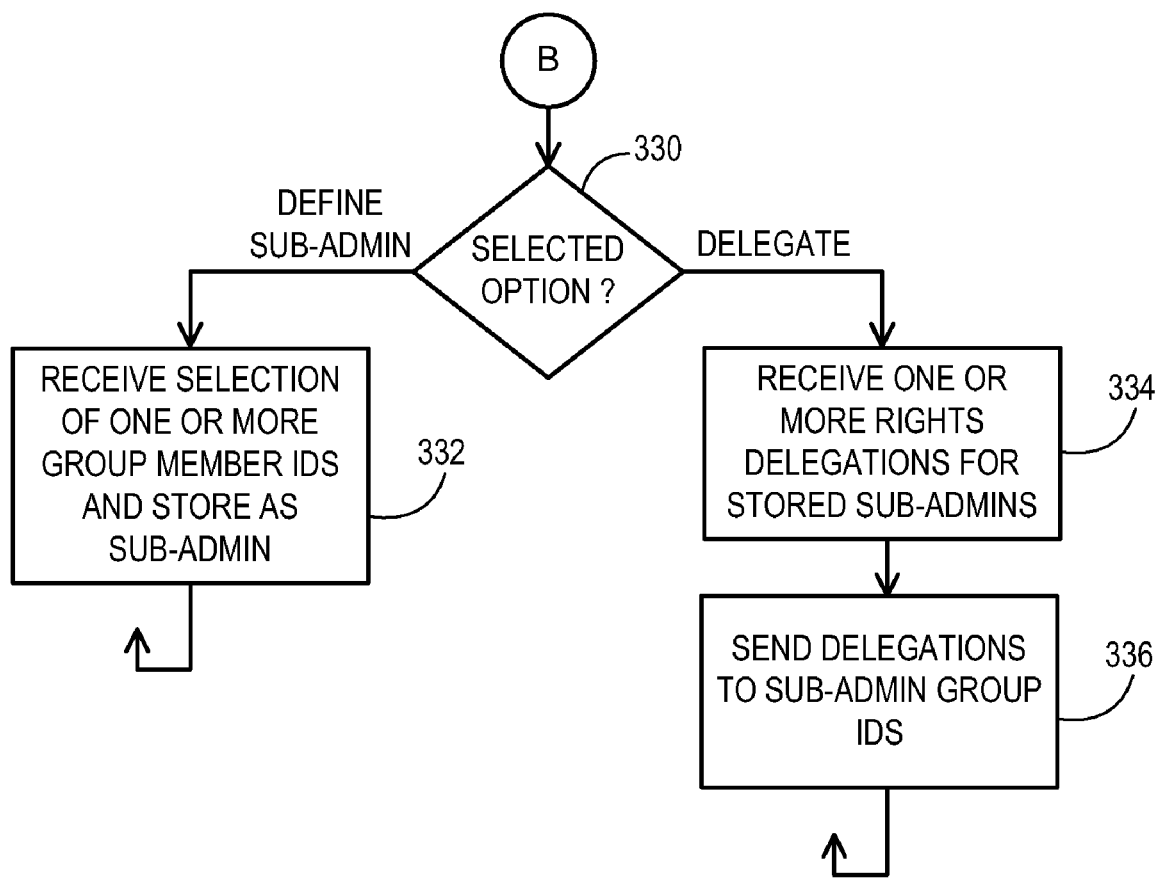

FIG. 3B shows one example of the logical operations performed by one of the mobile communications devices, particularly the administrator or sub-administrator but also other non-administrator devices in some embodiments. The logical operations begin at query operation 338 where the device detects whether a location polling time has occurred. The polling time may correspond to a time when the device utilizes its location device such as a GPS receiver in order to determine its own location, either absolutely or relative to the other group members depending upon the mode of group management that is occurring. To preserver battery life of the device, this polling period may be used rather than a continuous location update.

Furthermore, this polling period may also correspond to a time when the administrator or other device sends a request for absolute location to the other devices of the group being managed. For example, the request may be generated for embodiment in situations such as where the other devices are not configured to automatically report the location at the polling period in a general management mode, where a device has failed to report its location for this period, or where a device is found to be outside of the short-range such that its relative location within the flock is indeterminate and its absolute location is needed.

Upon the location polling time occurring, then a flocking mode path may occur, such as where at least some of the group member devices are being managed in a flock mode using short-range location detection. Likewise, a general monitoring mode path may occur such as where at least some of the group member devices are being managed in the general monitoring mode using short-range and/or long-range reporting of absolute location. It will be appreciated that all group members may be managed at a given time in flocking mode or in general monitoring mode. It will further be appreciated that some group members may be managed in flocking mode while at the same time other group members are being managed in general monitoring mode. Thus, the device may employ the logical operations of the flocking path or the general monitoring path or both at any given time.

Where flocking mode is applicable, then query operation 340 detects whether any group member devices are in short-range such that their relative location to the flock can be determined. If none are in short-range, then logical operations may proceed to query operation 356 otherwise used in the general monitoring mode in order to obtain absolute location as a back up manner of communicating with the group member who have strayed from the flock. If one or more group member devices are within short-range, then query operation 342 detects whether each of the group members in short-range falls within the specified relative distance thresholds defined for the flock or sub-flock. If one or more of the group member devices have exceeded the threshold parameters, then the device generates an alert at alert operation 344 to the user and also sends the alert to the group members via short-range peer-to-peer and/or long-range cellular communications as appropriate.

In some embodiments, the alert may go to all group members including the straying group member that has triggered the alert. In other embodiments, it may be desirable that the alert may not go to the group member who has triggered the alert, or a different alert is provided to that group member. There may be situations where it is not desirable to alert the triggering device in the same manner as alerting the other devices. For example, an alert may be startling to a young child who has strayed from their parent, so a lesser message may be sent to the young child to inform the child that the parent is coming to the child and to stay in the same place until the parent arrives. Furthermore, in the case of an abduction, it may be desirable to avoid having the triggering device generate a conspicuous alert or alarm so that the abductor is not tipped off about the location management service that may ultimately help find the abducted group member.

The alert being sent to the group members may be in the form of a text message, an instant message, an electronic mail message, an alert similar to that of a waiting voice message, and the like such that the users of the other devices are aware of the straying group member(s). The alert may specify the group member by name, specify a last known time of contact, a last known location coordinate, and so forth. Furthermore, the alert may include any custom message entered by the administrator or sub-administrator such as to instruct the members of the group to search for the straying group member, meet at a designated location, etc.

At this point, the flocking mode operations may follow simultaneous paths where the first path proceeds to query operation 356 to determine if any remaining group member devices that are not in short-range may respond via long-range cellular signaling. While the group member out of short-range may have strayed from the flock, it may be beneficial to know whether they are within a general monitoring area that may serve as a secondary threshold for alerting or alarming. So, if a group member is out of long-range, then an alert may be immediately generated at alert operation 344. If a group member device is found to be within long-range communication, then query operation 358 detects whether they are within the imputed range or specified area which is established as the secondary threshold for flocking mode monitoring. If so, then in this embodiment operational flow may return to query operation 338. As an alternative, operational flow may proceed to alert operation 344 where an alert may be generated to instruct other group member devices as to the location of the straying group member with an instruction to the group members.

The other simultaneous path of the flocking mode operations of this example includes proceeding to query operation 346 where the device determines whether the pertinent time threshold assigned to the violated distance threshold has been exceeded. The time threshold may be used to signify the urgency of the situation and thereby used to change the notification from an alert to an alarm. If the time threshold has not been exceeded, then query operation 348 detects whether the straying group member device is now compliant, i.e., has returned within the bounds of the flock if being managed in flocking mode. If so, then operational flow returns to query operation 338 as no further alert is required. A message may be sent to each of the group member devices to inform them that the straying group member has returned to the flock. If not, then query operation 346 continues to determine if the time threshold has been exceeded.

When the time threshold has been exceeded, then in this example, an alarm is generated at the administrator device at alarm operation 350 and is sent to the group members via short-range peer-to-peer and/or long-range cellular communications as appropriate. The alarm may be similar to the alert that was previously sent but may be more prominent, such as by using a loud repeating ringtone, vibration, etc. in order to convey the significance of the message to the group member. Additional actions may also be taken. For example, an auto-connection of a voice call may occur at connection operation 352 between a group member device, such as the closest group member device or the administrator device, and the non-compliant group member device.

Returning to query operation 338, where one or more of the group members are being managed using a general monitoring mode, then the device may obtain its own absolute location at location operation 354. The device may check its own location against the general monitoring area and may also compare the absolute location of the device to the absolute location of other group member devices. At query operation 356, the device detects whether all group members are in long-range by contacting them via the long-range cellular communication system to obtain their absolute location. If some are out of long-range communication, then in this example an alert is immediately generated at alert operation 344.

At this point, the general monitoring mode follows two parallel paths, one proceeding to query operation 346 to proceed with time threshold detection as discussed above in relation to flocking mode management. The other path involves returning to query operation 356 to determine if any remaining members are in long-range. If so, then query operation 358 detects whether those group members are within the imputed ranges and areas that have been specified for general monitoring mode. If so, then operational flow returns to query operation 338. Otherwise, alert operation 344 generates additional alerts for those outside of the permissible general monitoring bounds.

Figure 4A:
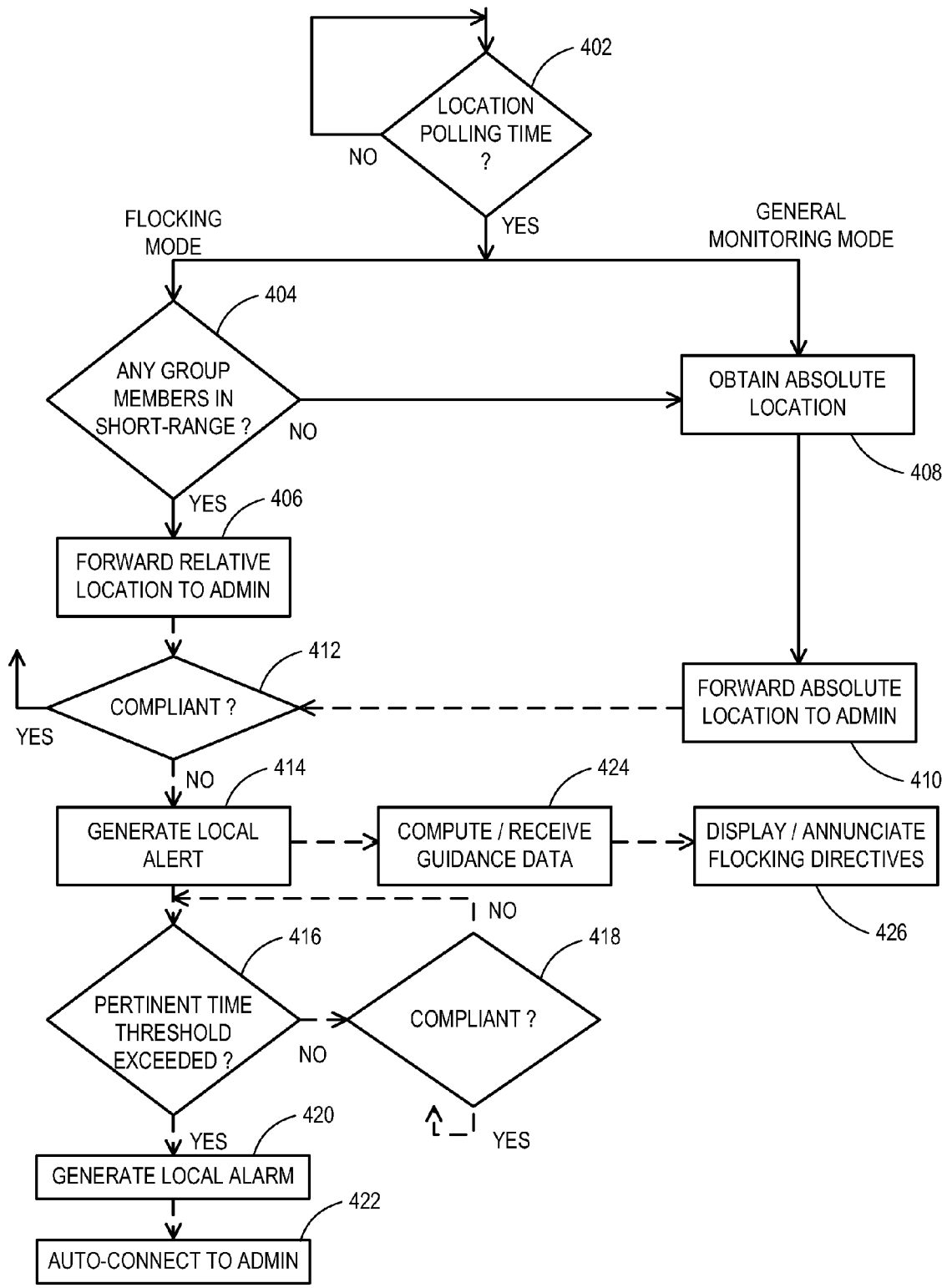
FIGS. 4A-4B show one example of the logical operations of a mobile communications device of a non-administrator member of the group.

FIG. 4A shows an example of the logical operations of a non-administrator group member device. The logical operations begin at location polling query operation 402 where it is determined that it is time to poll for the location of the device relative to the other group members. Where the device is set to operate in a flocking mode, then query operation 404 detects whether any other group member devices are in short-range. If not, then this group member is likely straying from the flock and the absolute location of this group member may be needed for a secondary location check. Therefore, the device obtains its absolute location at location operation 408 using a location device such as GPS, built-in cellular triangulation, etc. The device then forwards the absolute location to the administrator device using long-range communications at send operation 410.

If query operation 404 detects that other devices are in short-range, then the device may forward its relative location to the administrator device at send operation 406. For example, the device may send its elapsed times for a return signal from each device that is in short-range. Alternatively, the device may calculate relative distances to each of the group member devices and forward those distances to the administrator. The elapsed times may be converted to the relative distances, either at the group member device or at the administrator group member device to then determine whether the group member device is within the flock as defined by the relative distance thresholds. Operational flow may then return to query operation 402.

For embodiments where the group member device can make its own determination about compliance with the thresholds defined for it, then operational flow continues to query operation 412 where the device detects whether it is in compliance. If so, then operational flow returns to query operation 402. If not, then the device may generate a local alert at alert operation 414. The device may then detect whether assigned time thresholds have been exceeded at query operation 416. If not, the query operation 418 detects whether the device has returned to the flock. If the time threshold has been exceeded, then the device may generate a local alarm at alarm operation 420 and then may perform an auto-connect for a voice call to the administrator device at 422.

Returning to query operation 402, if the device is in a general monitoring mode, then the absolute location is obtained at location operation 408 and then the location is forwarded to the administrator device at send operation 410. If the device has the ability to check its own absolute location against the general monitoring thresholds that have been defined for it, then operational flow proceeds to query operation 412. Otherwise, operational flow returns to query operation 402.

Returning to alert operation 414, upon generating the alert at the device, then in various embodiments, the device may also provide guidance to the user that assists the user in returning to the flock. At guidance operation 424, the device may either compute or receive instructions for guiding the user to the flock. For example, the device itself may make determinations regarding returning to the flock where the device is provided with such logic and has either contacted other devices successfully through short-range or long-range communications or is attempting to return within a defined area. As another example, the device may receive instructions from another device, such as from an administrator device, a sub-administrator device, or a device in close physical proximity.

The guidance information that has been computed or received is then displayed or otherwise annunciated to the user at display operation 426. For example, the device may display the guidance information on the display screen or may provide audible instructions. The guidance instructions may be commands to re-join the group by moving in a certain direction, commands to look for the nearest group member who is specified to the user, commands to move toward a specified landmark, and/or commands to follow a sequence of specified movements. In this manner, the user of the device may be guided back to re-join the flock.

Figure 4B:
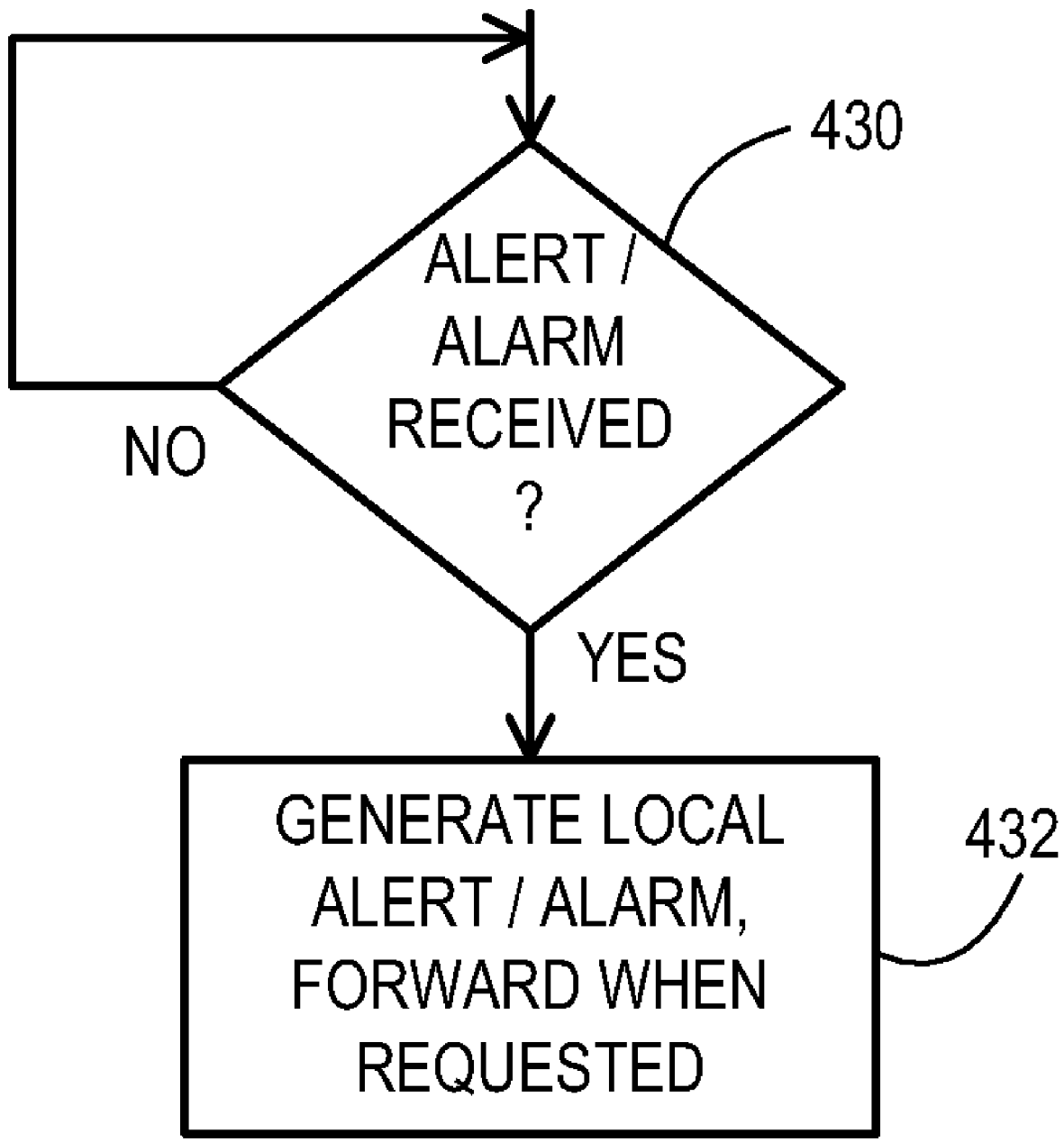

FIG. 4B shows additional operations that may be performed by the device in addition to those of FIG. 4A. At query operation 430, the devices detects whether an alert or alarm has been received through either short-range peer-to-peer or long-range cellular communications. Once an alert or alarm has been received, such as where the administrator device has concluded that a group member device, such as the group member device that has received the alert or alarm, has exceeded allowable thresholds and has sent the alert or alarm, the group member device then generates a corresponding local alert or alarm at notification operation 432. Furthermore, the instruction received from the administrator device may be to forward the alert or alarm to additional group member devices, such as those in short-range with the current group member device but beyond short-range relative to the administrator device or otherwise out of contact with the administrator device.

Thus, the mobile communications device management of group members can be achieved by obtaining relative and/or absolute locations of the group member devices and applying thresholds to those locations. Group members can be maintained within a flock or within a designated area and notifications can be generated to maintain awareness within the group as to the locations of group members straying beyond those thresholds to thereby utilize the group to find those group members and return them to the flock or permissible areas.

While illustrative embodiments have been particularly shown and described, it will be understood by those skilled in the art that various other changes in the form and details may be made therein without departing from the spirit and scope of the invention.

What is claimed is:

1. A mobile communications device comprising:
a wireless communications transceiver;
a location determination device;
a memory storing a first identifier of the mobile communications device and one or more identifiers for other mobile communications devices in a group; and
a processor configured to report information specifying a determined location generated by the location determination device in association with the first identifier to at least one other mobile communications device for which an identifier is stored and to receive information specifying a current location and identifier of at least one other mobile communications device, the processor being further configured to:
determine a first distance between the location of the mobile communications device and a first reference point;

determine a second distance between the location of the other mobile communications device and a second reference point;

if the first distance exceeds a first maximum allowable distance threshold, generate a notification; and if the second distance exceeds a second maximum allowable distance threshold, generate the notification.

2. The mobile communications device of claim 1, wherein the wireless communications transceiver is a short-range transceiver.

3. The mobile communications device of claim 1, wherein the wireless communications transceiver is a wireless network transceiver.

4. The mobile communications device of claim 3, further comprising a short-range wireless communications transceiver, and wherein the processor is configured to report information via the short-range wireless communications transceiver when in short-range of the at least one other mobile communications device to which the information is being sent and to report the information via the wireless network transceiver when not in short-range of the at least one other mobile communications device.

5. The mobile communications device of claim 1, wherein the processor is configured to keep track of a first amount of time that the first distance has exceeded the first maximum allowable distance threshold, keep track of a second amount of time that the second distance has exceeded the second maximum allowable distance threshold, generate the notification if the first amount of time exceeds a first time threshold, and generate the notification if the second amount of time exceeds a second time threshold.

6. The mobile communications device of claim 1, wherein the second distance between the at least one other mobile communications device and the second point of reference comprises at least one of:

distance from a closest mobile communications device of the group, distance from a calculated centroid of the group, distance from a mobile communications device at a center of the group, distance from a mobile communications device of an administrator of the group, and distance from a mobile communications device of a defined sub-group of the group.

7. The mobile communications device of claim 1, wherein the first reference point is fixed and the second reference point is dynamic.

8. A method of grouping users of mobile communications devices, comprising:

at a mobile communications device of one of the users, storing in memory a first identifier of the mobile communications device and one or more identifiers for other mobile communications devices in a group;

determining a current location of the mobile communications device at the mobile communications device;

reporting from the mobile communications device information specifying the determined location in association with the first identifier to at least one other mobile communications device for which an identifier is stored;

receiving at the mobile communications device information specifying a current location and an identifier of at least one other mobile communications device of the group;

determining whether the mobile communications device has exceeded a first maximum distance threshold from a first point of reference;

determining whether the at least one other mobile communications device has exceeded a second maximum distance from a second point of reference;

if the mobile communications device has exceeded the first maximum distance threshold, then generating a notification at the mobile communications device; and if the at least one other mobile communication device has exceeded the second maximum distance threshold, then generating the notification at the mobile communications device.

9. The method of claim 8, wherein determining whether the mobile communications device has exceeded the first maximum distance threshold and determining whether the at least one other mobile communications device has exceeded the second maximum threshold occurs at the mobile communications device.

10. The method of claim 8, wherein the second point of reference comprises at least one of a distance from a closest mobile communications device of the group, distance from a calculated centroid of the group, distance from a mobile communications device at a center of the group, distance from a mobile communications device of an administrator of the group, and distance from a mobile communications device of a defined sub-group of the group.

11. The method of claim 8, further comprising determining a first amount of time that the mobile communications device has exceeded the first maximum distance threshold from the first point of reference point, determining a second amount of time the at least one other mobile communications device has exceeded the second maximum distance from the second point of reference, comparing the first amount of time to an amount of time that the first maximum distance may be exceeded, comparing the second amount of time to an amount of time that the second maximum distance may be exceeded, generating the notification if the first amount of time that the first maximum distance has been exceeded is greater than the amount of time that the first maximum distance may be exceeded, and generating the notification if the second amount of time that the second maximum distance has been exceeded is greater than the amount of time that the second maximum distance may be exceeded.

12. The method of claim 8, wherein the notification comprises instructions for returning to the group.

13. The method of claim 12, wherein the instructions include at least one of commands to re-join the group by moving in a certain direction, looking for a nearest other device of the group, moving toward a specified landmark, and following a sequence of specified movements.

14. A non-transitory computer readable medium containing instructions that perform acts comprising:

at a mobile communications device of a user of a group, storing in memory a first identifier of the mobile communications device and one or more identifiers for other mobile communications devices in the group;

determining a current location of the mobile communications device at the mobile communications device;

reporting from the mobile communications device information specifying the determined location in association with the first identifier to at least one other mobile communications device for which an identifier is stored;

receiving at the mobile communications device information specifying a current location and an identifier of at least one other mobile communications device of the group;

determining whether the mobile communications device has exceeded a first maximum distance threshold from a first point of reference;

determining whether the at least one other mobile communications device has exceeded a second maximum distance threshold from a second point of reference;

if the mobile device has exceeded the first maximum distance threshold, then generating a notification at the mobile communications device; and if the at least one other mobile communications device has exceeded the second maximum distance threshold, then generating the notification at the mobile communication device.

15. The non-transitory computer readable medium of claim 14, wherein the second point of reference is a distance from a closest group member.

16. The non-transitory computer readable medium of claim 15, wherein the second point of reference is a distance from a centroid of the group.

17. The non-transitory computer readable medium of claim 15, wherein the first point of reference point is a fixed reference point within a perimeter surrounding a current position of at least one of the group members, and the second point of reference is a dynamic reference point within a perimeter surrounding a current position of at least one of the group members.

18. The non-transitory computer readable medium of claim 14, wherein the acts further comprise:

if the mobile communications device exceeds the first maximum distance threshold, completing a call between the mobile communications device and the at least one other mobile communications device; and if the at least one other mobile communications device exceeds the second maximum distance threshold, competing the call between the mobile communications device and the at least one other mobile communications device.

19. The non-transitory computer readable medium of claim 14, wherein the acts further comprise:

keeping track of a first amount of time that the first distance has exceeded the first maximum allowable distance threshold, keeping track of a second amount of time that the second distance has exceeded the second maximum allowable distance threshold, generating the notification if the first amount of time exceeds a first time threshold, and generating the notification if the second amount of time exceeds a second time threshold.

* * * * *